United States Patent
Pieczul et al.

(10) Patent No.: US 9,160,756 B2
(45) Date of Patent: Oct. 13, 2015

(54) METHOD AND APPARATUS FOR PROTECTING MARKUP LANGUAGE DOCUMENT AGAINST CROSS-SITE SCRIPTING ATTACK

(75) Inventors: Olgierd Pieczul, Dublin (IE); Mark Alexander McGloin, Dublin (IE); Mary Ellen Zurko, Groton, MA (US)

(73) Assignee: International Business Machines Corporation, Armonk, NY (US)

( * ) Notice: Subject to any disclaimer, the term of this patent is extended or adjusted under 35 U.S.C. 154(b) by 692 days.

(21) Appl. No.: 12/782,757

(22) Filed: May 19, 2010

(65) Prior Publication Data

US 2011/0289546 A1    Nov. 24, 2011

(51) Int. Cl.
*H04L 29/00* (2006.01)
*H04L 29/06* (2006.01)
*G06F 21/53* (2013.01)

(52) U.S. Cl.
CPC ............ *H04L 63/1408* (2013.01); *G06F 21/53* (2013.01)

(58) Field of Classification Search
USPC ...................................................... 726/1, 22
See application file for complete search history.

(56) References Cited

U.S. PATENT DOCUMENTS

| | | | |
|---|---|---|---|
| 7,444,678 B2 | 10/2008 | Whitmer et al. | |
| 7,457,951 B1 | 11/2008 | Proudler et al. | |
| 8,239,939 B2 * | 8/2012 | Dunagan et al. | 726/22 |
| 8,584,232 B2 * | 11/2013 | Kerschbaum | 726/22 |
| 2007/0136579 A1 | 6/2007 | Levy et al. | |
| 2007/0299857 A1 | 12/2007 | Gwozdz et al. | |
| 2008/0077653 A1 * | 3/2008 | Morris | 709/203 |
| 2008/0189757 A1 | 8/2008 | Schackow et al. | |
| 2008/0263650 A1 | 10/2008 | Kerschbaum | |
| 2008/0313648 A1 | 12/2008 | Wang et al. | |
| 2009/0165124 A1 | 6/2009 | Spektor | |
| 2009/0265760 A1 | 10/2009 | Zhu et al. | |
| 2009/0271690 A1 | 10/2009 | Iglesias | |

OTHER PUBLICATIONS

Ka-Ping Yee, Kragen Sitaker/ Passpet: Convienient Password Management and Phishing Protection/ 2006/ 1-12.*

* cited by examiner

*Primary Examiner* — Brandon Hoffman
*Assistant Examiner* — Michael D Anderson
(74) *Attorney, Agent, or Firm* — Jeffrey S. LaBaw; David H. Judson (57) ABSTRACT

A method for decomposing a web application into one or more domain sandboxes ensures that the contents of each sandbox are protected from attacks on the web application outside that sandbox. Sandboxing is achieved on a per-element basis by identifying content that should be put under protection, generating a secure domain name for the identified content, and replacing the identified content with a unique reference (e.g., an iframe) to the generated secure domain. The identified content is then served only from the generated secure domain.

25 Claims, 4 Drawing Sheets

```
<h1>Employee name: ${name}</h1>
<h2>Job title: ${title}</h2>
<h3 sandbox="true">Salary: ${salary}</h3>              502
<hr/>
<form action="${host}/setSalary" method="post" sandbox="true">
      <input type="hidden" name="employeeId" value="${employeeId}" />
      <input type="text" name="newSalary" />
      <input type="hidden" name="token" value="${securityToken}" />
      <input type="submit" value="Change ${name}'s salary" />
</form>
<div>Telephone number: ${telephone}</div>
```

```
<h1>Employee name: John Smith</h1>
<h2>Job title: Software Developer</h2>
<h3 sandbox="true">Salary: 31337</h3>
<hr/>
<form action="http://www.example.com/setSalary" method="post" sandbox="true">
      <input type="hidden" name="employeeId" value="12345" />
      <input type="text" name="newSalary" />
      <input type="hidden" name="token" value="3263333476383977633353" />
      <input type="submit" value="Change John Smith's salary" />
</form>
<div>Telephone number: 443712345</div>
```

```
      <h1>Employee name: John Smith</h1>
702 ─ <h2>Job title: Software Developer</h2>
      <iframe src="3132a3342536.app.example.com"></iframe>
      <hr/>
      <iframe src="31223324355e.app.example.com"></iframe>
704 ─ <div>Telephone number:443712345</div>
```

2132a3342536.app.example.com serves:
<h3>Salary: 31337</h3>                              804
                                                    ↙

31223324355e.app.example.com serves:
<form action="http://www.example.com/setSalary" method="post">
    <input type="hidden" name="employeeId" value="12345" />
    <input type="text" name="newSalary" />
    <input type="hidden" name="token" value="3263333347638397763353" />
    <input type="submit" value="Change John Smith's salary" />
</form>

*FIG. 8*

```
$out = ob_get_clean( ); // get output buffer contents
// find all tags with sandbox="true" parameter replace them with result of callback function
$out = preg_replace_callback('/<([a-z 0-9]*) [^ >]*sandbox="true".*<\/\1>/smU',
'move_to_iframe',$out);
echo $out; // return to modified content function move_to_iframe($matches)   {
        $domain = sha1(rand( )); // generate random domain name
        // save sandboxed element in the session for current user
        $_SESSION("content_$domain") = $matches(0) ;
        // return iframe for generated domain
        return "<iframe src=\"http://domain.sub.example.com/domain/\"> </iframe>";
}

4. Implementing sandboxed content handler:
// check whether handler is called with a subdomain
if (ereg('.sub.example.com', $_SERVER['SERVER_NAME']))   {
        // get random part of the domain
        $domain = str_replace('.sub.example.com','', $_SERVER['SERVER_NAME']);
        echo $_SESSION["content_$domain"]; // display contents of user session for that
            domain session_unregister("content_$domain"); // remove HTML block
}
```

*FIG. 9*

METHOD AND APPARATUS FOR PROTECTING MARKUP LANGUAGE DOCUMENT AGAINST CROSS-SITE SCRIPTING ATTACK

CROSS-REFERENCE TO RELATED APPLICATION

This application is related to Ser. No. 12/782,801, filed May 19, 2010, titled "Method and apparatus for serving content elements of a markup language document protected against cross-site scripting attack."

COPYRIGHT STATEMENT

A portion of the disclosure of this patent document contains material that is subject to copyright protection. The copyright owner has no objection to the facsimile reproduction of the patent document as it appears in the Patent & Trademark Office file or records, but it otherwise reserves all copyright rights.

BACKGROUND OF THE INVENTION

1. Technical Field

This disclosure relates generally to web application security and in particular to a method and system for decomposing a web application into protected components.

2. Background of the Related Art

Cross-Site Scripting (XSS) is a web application vulnerability that allows malicious users to inject code into pages that are viewed by other users. In many classifications, it is recognized as a top web application vulnerability class. The most severe consequences of XSS issues are that attacker is able to make a legitimate user's browser perform operations that change application state on behalf of that user, or that make a user's browser disclose private data.

There are several known methods to protect against an XSS attack. One approach is referred to an input filtering. This approach involves checking web application input for malicious data and rejecting or filtering it as needed. The input filtering method, however, cannot guarantee full protection, and it may be overly aggressive (to the point of being useless) if input data is used by web application in multiple contexts (e.g. HTML and Java Script). An alternative approach is to use client-side protection, whereby users equip their browsers with extensions that automatically detect attack attempts. The client-side approach, however, does not work properly with some types of XSS attacks, especially persistent XSS where injected code is not passed through input parameters.

Yet another approach, and one which is the best known solution, is referred to output escaping. XSS attacks happen when the application fails to escape its output and an attacker put HTML and/or Javascript on the site, which code then runs in the site visitors' web browsers. Output escaping stops this happening by making sure that the application never sends commands (HTML) when it only intends to send plaintext. This approach is designed to ensure that content rendered by the application contains a code (even if the code is input). To be implemented successfully, however, this solution requires significant attention from developers and an active approach from test teams.

The above described techniques show that, even with significant effort, it is difficult to eliminate XSS completely. The problem is exacerbated if the web application is created with software from different vendors.

Yet another solution is generally referred to as sandboxing of content in different domains. One available version of this approach is implemented in iGoogle, by which users can design a personalized web page. The primary goal of sandboxing is to separate page elements coming from different vendors into separate domains and to merge them on one page with inline frames using standard HTML iframe tags. This approach takes advantage of the web browser's native origin policy constraints. It isolates page parts from each other as well as from a parent page. Although widely used, the technique has proven difficult to adopt for use with regular applications as it requires splitting applications into parts and then merging those parts back together. Such work is time-consuming and creates support issues, as the page needs to be separated according to security requirements as opposed to its logical structure.

The techniques disclosed herein address these and other deficiencies of the known prior art.

BRIEF SUMMARY OF THE INVENTION

A method for decomposing a web application into one or more domain sandboxes ensures that the contents of each sandbox are protected from attacks on the web application outside that sandbox. Sandboxing is achieved on a per-element basis by identifying content that should be put under protection, generating a secure domain name for the identified content, and replacing the identified content with a unique reference (e.g., an iframe) to the generated secure domain. The identified content is then served only from the generated secure domain.

In a representative embodiment, an apparatus for protecting a markup language document against cross-site scripting attack comprises a processor, and computer memory holding computer program instructions that when executed by the processor perform a method. The apparatus is located or positioned within a response path that exists between a web application and a web browser. The method operates in an automated manner and begins upon receipt of the markup language document that is output from the web application. One or more content elements within the markup language page are then identified. For each of the one or more content elements identified, a secure domain name is generated. The secure domain name is uniquely associated with the content element. The content element in the markup language document is then replaced with a reference (e.g., an HTML iframe) that is associated with the secure domain name to generate a modified markup language document. The modified markup language document is then transferred to the web browser. During the automated method, the content element itself is stored. Thereafter, the content element is served only from a domain identified by the secure domain name uniquely associated with the content element. Where multiple content elements in the document are processed in this manner, the secure domain name includes a first portion that is an identifier uniquely associated with the content element, together with a "common" second portion that points to a content handler associated with the domain. Requests for the content element are then served by the content handler as opposed to from the web application (or other entity).

The foregoing has outlined some of the more pertinent features of the invention. These features should be construed to be merely illustrative. Many other beneficial results can be attained by applying the disclosed invention in a different manner or by modifying the invention as will be described.

BRIEF DESCRIPTION OF THE DRAWINGS

For a more complete understanding of the present invention and the advantages thereof, reference is now made to the following descriptions taken in conjunction with the accompanying drawings, in which.

DETAILED DESCRIPTION OF AN ILLUSTRATIVE EMBODIMENT

Figure 1:
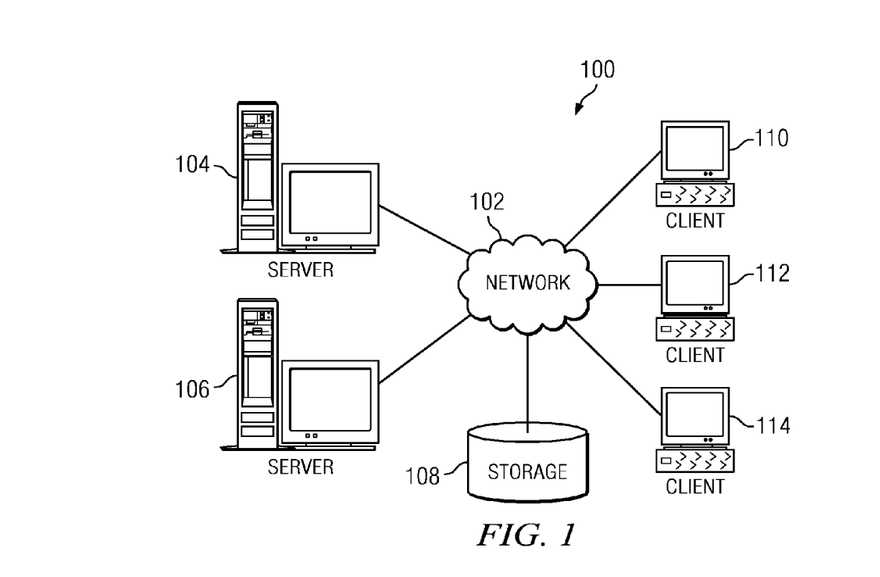
FIG. 1 depicts an exemplary block diagram of a distributed data processing environment in which exemplary aspects of the illustrative embodiments may be implemented.
Figure 2:
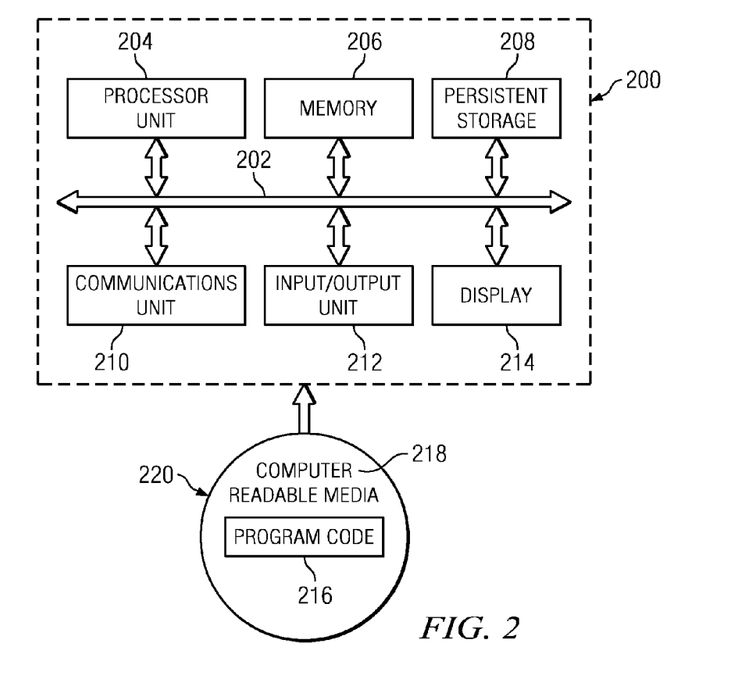
FIG. 2 is an exemplary block diagram of a data processing system in which exemplary aspects of the illustrative embodiments may be implemented.

With reference now to the drawings and in particular with reference to FIGS. 1-2, exemplary diagrams of data processing environments are provided in which illustrative embodiments of the disclosure may be implemented. It should be appreciated that FIGS. 1-2 are only exemplary and are not intended to assert or imply any limitation with regard to the environments in which aspects or embodiments of the disclosed subject matter may be implemented. Many modifications to the depicted environments may be made without departing from the spirit and scope of the present invention.

With reference now to the drawings, FIG. 1 depicts a pictorial representation of an exemplary distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the disclosed subject matter, and therefore, the particular elements shown in FIG. 1 should not be considered limiting with regard to the environments in which the illustrative embodiments of the present invention may be implemented.

With reference now to FIG. 2, a block diagram of an exemplary data processing system is shown in which aspects of the illustrative embodiments may be implemented. Data processing system 200 is an example of a computer, such as client 110 in FIG. 1, in which computer usable code or instructions implementing the processes for illustrative embodiments of the disclosure may be located.

With reference now to FIG. 2, a block diagram of a data processing system is shown in which illustrative embodiments may be implemented. Data processing system 200 is an example of a computer, such as server 104 or client 110 in FIG. 1, in which computer-usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multiprocessor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices. A storage device is any piece of hardware that is capable of storing information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer-usable program code, or computer-readable program code that may be read and executed by a processor in processor unit 204. The program code in the different embodiments may be embodied on different physical or tangible computer-readable media, such as memory 206 or persistent storage 208.

Program code 216 is located in a functional form on computer-readable media 218 that is selectively removable and may be loaded onto or transferred to data processing system 200 for execution by processor unit 204. Program code 216 and computer-readable media 218 form computer program product 220 in these examples. In one example, computer-readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer-readable media 218 also may take the form of a persistent storage, such as a hard drive, a thumb drive, or a flash memory that is connected to data processing system 200. The tangible form of computer-readable media 218 is also referred to as computer-recordable storage media. In some instances, computer-recordable media 218 may not be removable.

Alternatively, program code 216 may be transferred to data processing system 200 from computer-readable media 218 through a communications link to communications unit 210 and/or through a connection to input/output unit 212. The communications link and/or the connection may be physical or wireless in the illustrative examples. The computer-readable media also may take the form of non-tangible media, such as communications links or wireless transmissions containing the program code. The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. As one example, a storage device in data processing system 200 is any hardware apparatus that may store data. Memory 206, persistent storage 208, and computer-readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Computer program code for carrying out operations of the present invention may be written in any combination of one or more programming languages, including an object-oriented programming language such as Java™, Smalltalk, C++ or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the SMP system mentioned previously, without departing from the spirit and scope of the disclosed subject matter.

Figure 3:
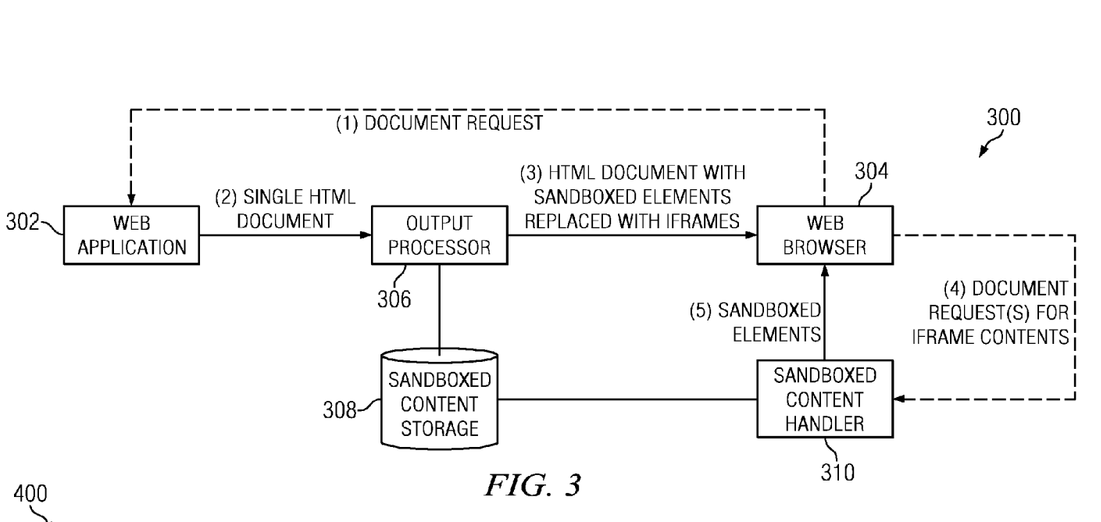
FIG. 3 is a block diagram of a set of components that provide a system for automated decomposition of a web page into domain sandboxes according to the teachings of this disclosure.

FIG. 3 illustrates the high level components of a system 300 that implements automated processing of a web application 302 into domain sandboxes for rendering by a browser (or equivalent rendering engine) 304 according to this disclosure. As is well-known, the web browser executes on a client and the web application executes on a server, such as a "client" and a "server" illustrated in FIG. 1. As used herein, the phrase "web application" should be broadly construed to include server-side processes, components and/or functions that generate markup language documents, such as HTML. Web applications typically include, without limitation, an HTTP daemon (namely, a web server), a J2EE servlet, a PHP or equivalent script, an application server, or the like. While the page output from the web application 302 typically is a markup language page such as HTML, this is not a limitation, as the techniques described herein may be implemented with an output that is of any markup language format (e.g., XML, HDML, WML, and the like). As is well-known, typically an HTML document is output from the web application 300 in an HTTP request-response exchange as a data stream. The term "browser" likewise should be broadly construed to cover an HTTP browser, plug-in, or other client-side code for outputting (e.g., rendering) markup language or equivalent data.

Preferably, the web application 302 and the web browser 304 are external to the system 300, which as illustrated in FIG. 3 comprises output processor 306, sandboxed content data store 308, and sandboxed content handler 310. Although many implementations are possible, preferably the components 306, 308 and 310 are implemented as a standalone proxy or other intermediary, or as a hosted (i.e. managed) service provided by a service provider. As such, the system components (and, in particular, components 306 and 310) operate on the document output by the web application without any particular dependency on the technologies used to generate the document data. Components 306 and 310 may be separate or integrated. Components 306 and 310 may also execute on a single machine or process, or in machines (or processes) that are located remotely from one another. The data store 308 may be co-located with one or both of the other components 306 and 310, or the data store may be accessible to one or both of the components 306 and 310 remotely.

Communications between component 306 and the data store, or between component 310 and the data store, may be secure (e.g., using SSL, TLS, or the like). There may be multiple instances of any of the system components.

The system 300 (and, in particular, the output processor 306) operates to reduce the risk of injected code by decomposing a document into one or more separate domains. As will be seen, this functionality serves to isolate (i.e. sandbox) important operations or data so that unwanted code injected in one part of the output document (e.g., by an XSS exploit) will not endanger other portions. To this end, and as will be described in more detail below, the output processor 306 performs several functions as the document is being returned to the browser, namely: identifying a piece of content in the document that should be put under protection as a "sandboxed" element, generating a secure domain name for that content, storing the sandboxed element in the sandboxed content data store 308, and replacing the sandboxed element with a reference (e.g., an iframe) to the secure domain. These functions are performed by way of the output processor 306 intercepting the data stream output by the web application 302. The modified document that results from this processing is then served to the browser for rendering.

Upon receipt of the document as modified by the output processor, the browser attempts to render the page contents in the unusual manner. For each iframe reference, the browser issues a separate request (e.g., an HTTP GET) that is received by the sandboxed content handler 310. The sandboxed content handler 310 retrieves the associated content element from the sandboxed content data store 308 and serves it back to the browser. The browser uses that content to render the page.

The overall operation is best seen in FIG. 3. At step (1), the browser 304 issues a request to the web application 302 in the usual manner. At step (2), the web application 302 responds, once again in the usual manner, by outputting an HTML document. The output processor 306 intercepts the content as it passes back to the browser. As noted above, the output processor 306 identifies what elements should be sandboxed, generates domain names and replaces them with iframes. Replaced elements are stored for future use in the sandboxed content data store 308 while in step (3) the resulting document is forwarded back to the web browser 304. At step (4), the browser 304 sends a request for content in each iframe it identifies to the sandboxed content handler 310. The sandboxed content handler 310 fetches the content from the sandboxed content data store 308 and at step (5) returns the sandboxed element(s) to the browser 304 for inclusion in the page being rendered.

There is no limitation on the number (or type or size) of content elements that may be sandboxed within the document. Thus, as used herein, the term "decomposing" as applied to the output of the web application should be broadly construed to refer to at least one element of the document being processed in the manner described above. Preferably, the resulting "sandboxed element" is associated with a "domain" that differs from the domain of the "parent" page of which the element is a part. Typically, there will be multiple sandboxed elements within a page, with each page element being replaced with an iframe that points to a unique domain that is served only by the sandboxed content handler. Preferably, each resulting sandboxed element also is associated with its own unique domain that differs from the domain of the parent page as well as the domain of any other sandboxed element.

The output processor 302 may be implemented in a data processing system such as illustrated in FIG. 2 and described above. In one embodiment, the output processor 302 is implemented in software, as a set of computer program instructions, executed by a hardware processor. As noted above, the output processor is the main part of the automated decomposition process. It is responsible for identifying content to secure, storing it for future usage, and modifying the page by replacing elements with iframes.

The selection of which elements of the page should be sandboxed may vary. The selection may be done by a web developer, or by a security entity having responsibility for the web application code. In an alternative embodiment, a page element to be "protected" according to the disclosed scheme can be marked with an additional parameter, or it may be enclosed in special-purpose HTML tags that are recognized by the output processor. The latter approach is simple to implement, and it does not increase code complexity as will be shown below. The identification of the one or more elements may also be performed automatically based on predefined rules or policies implemented by the output processor. To this end, the output processor may include a user or programmatic interface by which a permitted entity or process configures the output processor 306 according to a policy, a rule, or the like. Basically, a policy or rule (however designated) is an "if then" function that examines the document for the argument and performs the domain name generation and iframe replacement functions described above. One such policy might be to replace all "form" elements or replace certain HTML tags, while a rule might replace "all calls to an identified URL pattern" or the like. As one of ordinary skill will appreciate, the output processor thus may be configured to examine the web application document for particular markup elements, element values or expressions, and then perform the decomposition functionality for each such page component.

As noted above, to ensure proper isolation, sandboxed elements are in different domains from the parent page as well as in different domains with respect to each other. Each sandboxed domain, however, must point to the sandboxed content handler. The sandboxed domain is identified by a secure domain name. Provided the above constraints are maintained, the domain names themselves may be of any convenient format (consistent with Internet RFC 1034). Nevertheless, some formats and domain name schemes will be preferable over others. Thus, for example, using an iterative set of domains (e.g., domain1, domain2, domain3 . . . ) for every next element of the page is not optimal, as a possible attacker might allow an attacker to have a single page (their own) with child iframes (application pages) that include child pages (sandboxed elements) in the same sequential domains. A better approach is to use randomly generated domain names with high entropy.

As noted above, when a domain is defined, the element that is about to be sandboxed is replaced with an iframe tag whose "src" parameter points at the sandboxed content handler in the generated domain. Because sandboxed elements may have different dimensions, the output processor may also include additional functionality to respect the size of the element being sandboxed so that the substituted iframe also is sized accordingly. As noted above, the replaced sandboxed elements are stored for future use in the sandboxed content data store. A representative data store is a computer disk or memory, and the data may be stored therein in any convenient manner. Typically, a sandboxed element is stored along with the domain name used in the corresponding iframe, and optionally an identity of a user (or user group) that is allowed to access that element.

As noted above, the sandboxed content handler's responsibility is to handle the browser's request for contents of each iframe. To this end, the sandboxed content handler 310 accesses an element stored in the data store 308 using the domain name by which it was called. Depending on implementation, the sandboxed content handler 310 also may use parameters, such as URL part or query string, to facilitate the sandboxed element retrieval. In addition, in a preferred embodiment the sandboxed content handler also performs an authentication function or check to ensure that the content is being accessed by a permitted user, perhaps even a user for which the sandboxed content has been generated specifically.

Thus, preferably the user accessing the sandboxed content handler 310 is authenticated. This additional security protection ensures that even a successful XSS attack over the parent page does not compromise authentication that is used by iframes. To facilitate this additional protection, the user is required to authenticate separately to obtain access to sandboxed content. In one approach, the user may access the parent page (the web application output) using conventional authentication (entering a user id and password), but he or she can only obtain critical content within an iframe by a separate authentication, such as entering a one-time password. The particular type of authentication is not a limitation of this invention, however, as any known techniques may be used.

If separate authentication is not a requirement, single-sign on to the page content (including the sandboxed element(s)) may be achieved using one or more alternative approaches. In one alternative, an HttpOnly cookie is issued for the domain and all subdomains. By using an HttpOnly flag, the cookie is not available for client-side scripts (and so not available through XSS attack). In the alternative, if a fixed set of sandbox domains is desired, separate authentication cookies for all of these domains can be issued in connection with a single login process. This approach ensures that cookies for all the domains are available when the user is authenticated but makes them unavailable from other domains.

An additional security variation is to construct the page such that all visible elements are sandboxed in iframes and the parent page is XSS-secured. This approach can minimize the risk of clickjacking attacks.

Figure 4:
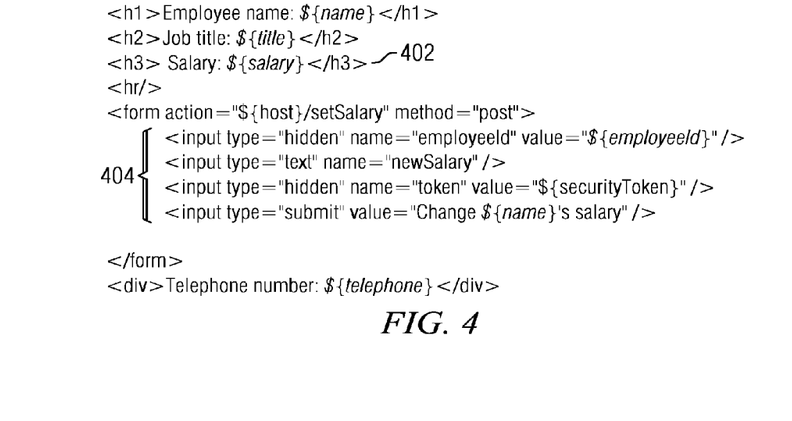
FIG. 4 is a portion of an example web page markup.
Figure 5:
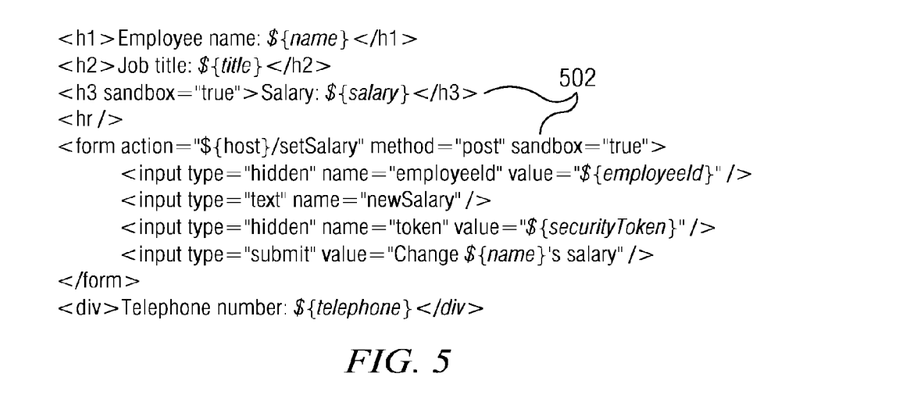
FIG. 5 illustrates the example web page markup that has been modified to identify page elements that will be sandboxed according to the techniques described herein.

FIGS. 4-8 illustrate decomposition and delivery functions described above. Familiarity with basic HTML is presumed. FIG. 4 illustrates a representative portion 400 of a web page output from a web application. This portion is associated with the domain www.example.com. The portion 400 includes HTML markup including a header h3 402 associated with a Salary element, as well as an HTML fill-in form 404 that allows the manager to modify certain information, such an employee salary. The notation ${variable} is used for variable substitution.

Figure 6:
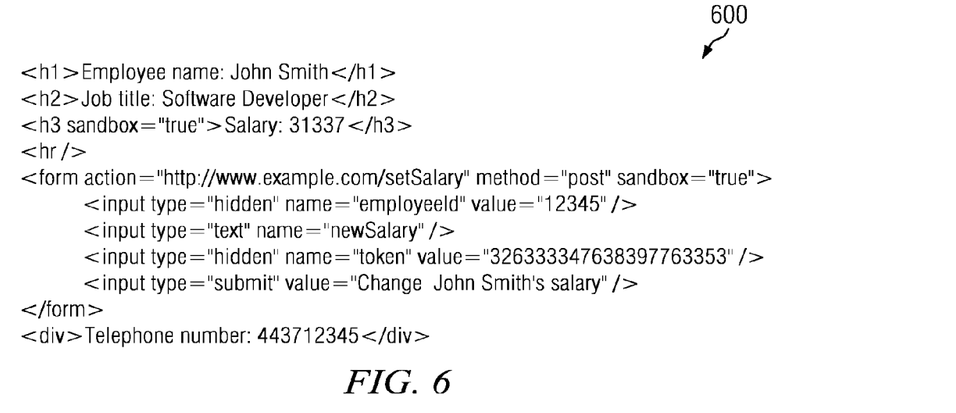
FIG. 6 illustrates the example web page of FIG. 5 that is generated by the web application.

Now, assume that the developer (or other entity) decides that information about the employee's salary is to be sandboxed according to the techniques described herein. To this end, and with reference to FIG. 5, during the page development process the developer then marks the tags associated with these elements to include an additional "sandbox" parameter. As noted above, this is one approach for instructing the output processor to later perform the sandbox operation (when the page having this markup is intercepted), although as noted above other configuration-based approaches may be used as well. In this example, the Salary heading associated with tag h3 is modified to include the "sandbox="true" parameter 502, and the HTML form markup is modified to include this phrase within the POST method. FIG. 6 illustrates the actual page portion 600 as it is generated (output) by the web application, which was step (2) in FIG. 3. As can be seen, this particular page excerpt includes the actual salary data, namely $31,337, and it also indicates that the HTML form is to be evaluated at the www.example.com domain by the setSalary POST method to which the sandbox="true" phrase has been associated. The page excerpt also includes a security token value that has been generated by the web application.

Figure 7:
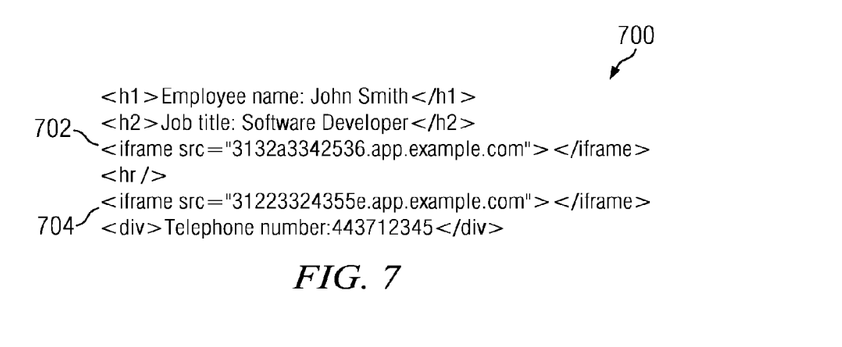
FIG. 7 illustrates the example web page markup of FIG. 6 after the output processor has processed the page.

The output processor 306 of the system receives this page excerpt and is triggered to process the page by the inclusion of the sandbox=true parameter. To this end, the output processor first generates unique domain identifiers (IDs or UIDs) for each block marked for separation. In this example, the output processor generates the domain ID "2132a3342536" for the h3 tag, and "31223324355e" for the HTML form. Any convenient random or deterministic method may be used to generate these identifiers, although as noted above preferably randomly-generated identifiers are used. The output processor then generates the associated secure domain name for each sandboxed element by prepending the unique identifier to a domain name that points to the sandboxed content handler. Thus, in this step the output processor takes that domain ID and prepends it as follows: domainID.app.example.com. A prepend of the domainID is not a limitation, as any convenient domain name format may be used (consistent with RFC 1034) provided that the resulting domain points only to the sandboxed content handler. After generating the secure domain name, the output processor performs the iframe substitutions to complete the decomposition process. FIG. 7 illustrates the resulting modified page 700 excerpt that is then returned to the web browser (this was step (3) in FIG. 3). As can be seen, the sandboxed content is now replaced with a reference to the generated domain. In particular, the h3 element 702 is replaced with "<iframe src="2132a3342536.app.example.com></iframe>" while the form element 704 is replaced with the following: "<iframe src="31223324355e.app.example.com></iframe>". As noted above, the app.example.com sub-domain points only to the sandboxed content handler so that requests to this domain are sent to the handler.

As noted above, a domain ID may be randomly-generated. Another approach to generating the domain ID may be to apply a given function, such as a cryptographic hash, to the content element. A representative hash function is MD5, MD6, SHA-1, SHA-2, or the like.

As can be seen, and with respect to the first and second content elements on the www.example.com page, each such content element is replaced with a reference (e.g., an iframe) that comprises a secure domain name. The secure domain name for each content element preferably includes a first part, and a second part. The first part is the domain ID, which is unique for each content element, and the second part (e.g., "app.example.com"), which is common for both content elements (and which points to the sandboxed content handler, or an instance thereof). As used herein, the phrase "secure domain name" should be broadly construed to refer to a domain (consistent with the meaning set forth in RFC 1034) and that conforms to this naming scheme although, as already noted above, the particular ordering of elements within the name is not limited. The word "secure" in this context is merely a descriptor, and it is not meant to require that the name itself be subject to a security mechanism.

As noted above, the number of page elements that may be sandboxed in this manner is variable. In this example, there are two sandboxed page elements; thus, there are two (2) distinct iframes, each of which is identified by a unique (secure) domain name that points to the sandboxed content handler.

Figure 8:
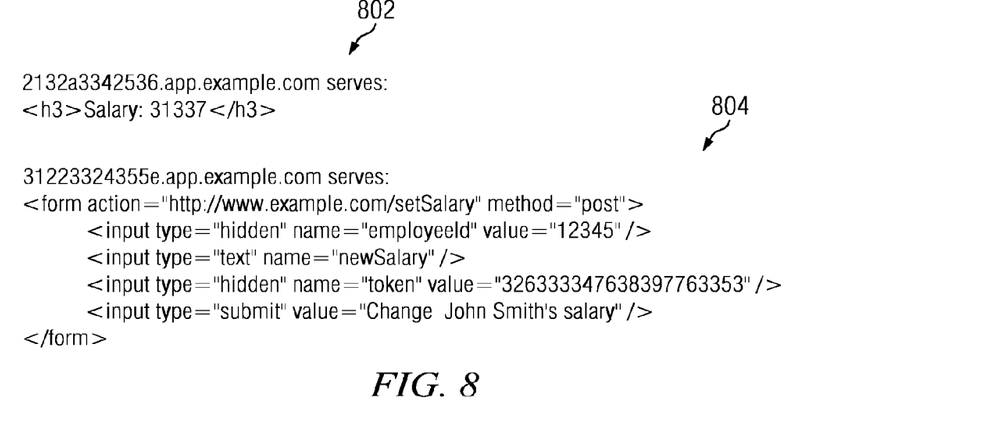
FIG. 8 illustrates the page elements that are stored in the sandboxed content data store.

FIG. 8 illustrates the portions of the page that are then stored in the sandboxed content data store. They include the Salary element 802, as well as the HTML form element 804. As noted above, when the browser receives the page portion of FIG. 7, it renders the page in the usual manner. When the iframe tag 702 is reached, the browser issues a request to the sandboxed content handler for the content element associated with the 2132a3342536 identifier. Upon receipt of the request, the handler uses the identifier to perform a lookup for the content element. As noted above, the handler may also require that the user perform some authentication (or otherwise provide evidence thereof) perform the content is fetched and served back to the browser. If the request is authorized, the handler fetches the content and returns it to the browser. The browser then makes a second request back to the handler to receive the HTML form portion 804 that that is identified by the iframe tag 704, and the process repeats. Once the browser receives all of the sandboxed content, it can complete the page rendering.

The browser (or an associated name server) may identify the sandboxed content handler using a domain name service (DNS) query. In one approach, the browser or its name server makes a DNS query (to the secure domain name) and receives back an Internet Protocol (IP) address (if that address is not otherwise cached in the browser or name server). The browser then issues an HTTP request (such as a GET) to the content handler's IP address, passing the identifier in a host header or the like. The handler, following authentication, then uses the identifier to perform the lookup for the content element. Of course, any other convenient technique to identify the sandboxed content handler and/or to obtain the stored content element may be used.

As noted above, there may be more than one instance of the sandboxed content handler executing in more than one location or on more than one machine or process. A particular sandboxed content handler instance may also be uniquely associated with a particular secure domain, or secure domain type. Generalizing, the handler is a software routine, i.e. a set of computer program instructions, executed by a hardware processor and that performs the above-described functions.

Figure 9:
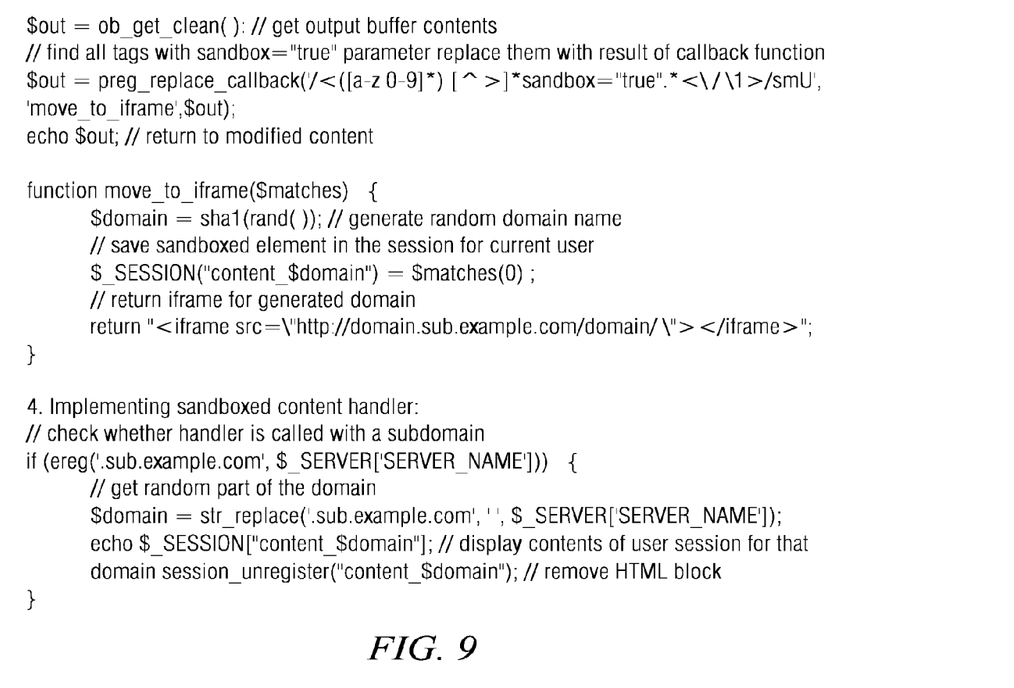
FIG. 9 illustrates a representative implementation of the output processor.

FIG. 9 illustrates representative code to implement the output processor functionality. The sandboxed content handler may be implemented using an HTTP daemon that is augmented to go forward to the sandboxed content data store as needed to fetch the stored content elements.

The data store may be implemented in memory and need not be persistent.

The use of iframes as the reference mechanism is not meant to be limiting, as any convenient referencing technique (e.g., fully-qualified URLs) may be used. Thus, the term "reference" as used herein should be broadly construed to refer to any known technique that associates the secure domain name to the content element.

Thus, according to the techniques described herein, a web application (or the output thereof) is decomposed into one or more domain sandboxes with the contents of each sandbox being protected from attacks on the web application outside that sandbox. Sandboxing is achieved on a per-element basis by identifying content that should be put under protection, generating a secure domain name for the identified content, and replacing the identified content with a unique reference (e.g., an iframe) to the generated secure domain. The identified content is then served from, and only from, the generated secure domain. Preferably, the secure domain names are generated in such a manner that they cannot easily be reverse-engineered.

The techniques described herein have numerous advantages. Because the technique may be implemented using an output processor, it operates only on document data, thus it has no dependency on any particular technology that is used to generate the page. An instance of the process can be fully separated from the application and implemented as a proxy between the application and browser. Another advantage of the process is that it may be implemented just with a few simple operations like pattern matching, string substitution, and storing and recalling blocks of text. It can be provided as a small and efficient implementation with no or little performance cost to the application or system.

The block diagrams in the different depicted embodiments illustrate the architecture, functionality, and operation of some possible implementations of apparatus, methods and computer program products. In this regard, each block in the flowchart or block diagrams may represent a module, segment, or portion of code, which comprises one or more executable instructions for implementing the specified function or functions. In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved.

The disclosed subject matter can take the form of an entirely hardware embodiment, an entirely software embodiment or an embodiment containing both hardware and software elements. In a preferred embodiment, the invention is implemented in software, which includes but is not limited to firmware, resident software, microcode, etc.

The disclosed subject matter can take the form of a computer program product accessible from a computer-usable or computer-readable medium providing program code for use by or in connection with a computer or any instruction execution system. For the purposes of this description, a computer-usable or computer readable medium can be any tangible apparatus that can contain or store the program for use by or in connection with the instruction execution system, apparatus, or device.

The medium is tangible, and it can be an electronic, magnetic, optical, electromagnetic, infrared, or semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

In one embodiment, the program instructions are stored in a computer readable storage medium in a data processing system, and these instructions are downloaded over a network from a remote data processing system. In an alternative embodiment, the instructions are stored in a computer readable storage medium in a server data processing system, and the instructions are downloaded over a network to a remote data processing system for use in a computer readable storage medium with the remote system.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

Finally, while given components of the system have been described separately, one of ordinary skill will appreciate that some of the functions may be combined or shared in given instructions, program sequences, code portions, and the like.

As described above, a data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the disclosed subject matter has been presented for purposes of illustration and description, and is not intended to be exhaustive or limited to the invention in the form disclosed. Many modifications and variations will be apparent to those of ordinary skill in the art. The embodiment was chosen and described to best explain the principles of the invention, the practical application, and to enable others of ordinary skill in the art to understand the invention for various embodiments with various modifications as are suited to the particular use contemplated.

As noted, the techniques described herein may be implemented in or in conjunction with various server-side architectures including simple n-tier architectures, web portals, federated systems, and the like.

As described above, an output processor, data store and handler mechanism that implements the disclosed techniques may be implemented as a service, or as a standalone machine, system, device, program or process.

The phrase "content element" as used herein should be broadly construed to refer to any portion of a markup language document, whether that element is associated with content that is visible on a page (when the page is rendered) or otherwise hidden from view.

Having described our invention, what we now claim is as follows.

The invention claimed is:

1. Apparatus for protecting a markup language document against a cross-site scripting attack, comprising: a processor; computer memory holding computer program instructions that when executed by the processor perform a method, comprising: receiving a markup language document; identifying one or more content elements within the markup language document; for each of the one or more content elements identified, generating a secure domain name that is uniquely associated with the content element, wherein the secure domain name includes a first portion that is a unique identifier, and a second portion, the first portion and the second portion of the secure domain name being in a particular order, the unique identifier being generated randomly or by applying a cryptographic hash function to the content element; removing the content element from the markup language document and replacing the removed content element with a reference that is associated with the secure domain name to generate a modified markup language document; and transferring the modified markup language document.

2. The apparatus as described in claim 1 wherein the method further includes serving the content element only from a domain identified by the secure domain name uniquely associated with the content element.

3. The apparatus as described in claim 1 wherein the reference is an HTML iframe.

4. The apparatus as described in claim 1 wherein the second portion of each secure domain name is common to each secure domain name.

5. The apparatus as described in claim 1 wherein the method further includes storing the content element.

6. The apparatus as described in claim 5 wherein the method further includes:
receiving a request for the content element;
determining if the request for the content element is associated with an authorized user;
if the request for the content element is associated with the an authorized user, serving the content element in response to the request.

7. The apparatus as described in claim 1 wherein the markup language document is received from a web application, and wherein the modified markup language page is transferred to a web browser.

8. The apparatus as described in claim 1 wherein the identifying step identifies a parameter in the content element indicating that the content element is to be sandboxed.

9. The apparatus as described in claim 1 wherein the identifying step identifies the content element using a configured policy or rule.

10. The computer program product as described in claim 9 wherein the method further includes serving the content element only from a domain identified by the secure domain name uniquely associated with the content element.

11. The apparatus as described in claim 1 wherein the first portion of the secure domain name is prepended to the second portion of the secure domain name.

12. A computer program product in a non-transitory computer readable medium for use in a data processing system for protecting a markup language document against a cross-site scripting attack, the computer program product holding computer program instructions which, when executed by the data processing system perform a method, comprising: receiving a markup language document; identifying one or more content elements within the markup language document; for each of the one or more content elements identified, generating a secure domain name that is uniquely associated with the content element, wherein the secure domain name includes a first portion that is a unique identifier, and a second portion, the first portion and the second portion of the secure domain name being in a particular order, the unique identifier being generated randomly or by applying a cryptographic hash function to the content element; removing the content element from the markup language document and replacing the removed content element with a reference that is associated with the secure domain name to generate a modified markup language document; and transferring the modified markup language document.

13. The computer program product as described in claim 12 wherein the reference is an HTML iframe.

14. The computer program product as described in claim 12 wherein the second portion of each secure domain name is common to each secure domain name.

15. The computer program product as described in claim 12 wherein the method further includes storing the content element.

16. The computer program product as described in claim 15 wherein the method further includes:
receiving a request for the content element;

determining if the request for the content element is associated with an authorized user;

if the request for the content element is associated with the an authorized user, serving the content element in response to the request.

17. The computer program product as described in claim 12 wherein the markup language document is received from a web application, and wherein the modified markup language page is transferred to a web browser.

18. The computer program product as described in claim 12 wherein the identifying step identifies a parameter in the content element indicating that the content element is to be sandboxed.

19. The computer program product as described in claim 12 wherein the identifying step identifies the content element using a configured policy or rule.

20. The computer program product as described in claim 12, wherein the computer program instructions are stored in the computer readable medium in the data processing system, wherein the computer program instructions were downloaded over a network from a remote data processing system.

21. The computer program product as described in claim 12, wherein the computer program instructions are stored in the computer readable medium in the data processing system, wherein the computer program instructions are downloaded over a network to a remote data processing system for use in a computer readable medium with the remote system.

22. The computer program product as described in claim 12 wherein the first portion of the secure domain name is prepended to the second portion of the secure domain name.

23. A method for protecting a markup language document against a cross-site scripting attack, comprising: receiving a markup language document; identifying one or more content elements within the markup language document; for each of the one or more content elements identified, generating a secure domain name that is uniquely associated with the content element, wherein the secure domain name includes a first portion that is a unique identifier, and a second portion, the first portion and the second portion of the secure domain name being in a particular order, the unique identifier being generated randomly or by applying a cryptographic hash function to the content element; removing the content element from the markup language document and replacing the removed content element with a reference that is associated with the secure domain name to generate a modified markup language document; wherein at least the generating and replacing steps are performed by a processing server.

24. The method as described in claim 23 further including serving the content element only from a domain identified by the secure domain name uniquely associated with the content element.

25. The method as described in claim 24 wherein the serving step includes:

receiving a request for the content element;

determining if the request for the content element is associated with an authorized user;

if the request for the content element is associated with the an authorized user, serving the content element in response to the request.

* * * * *